United States Patent
Eun et al.

(10) Patent No.: US 11,587,693 B2
(45) Date of Patent: Feb. 21, 2023

(54) SOLIDIFYING METHOD OF HYDROXIDES OF RADIONUCLIDES

(71) Applicant: KOREA ATOMIC ENERGY RESEARCH INSTITUTE, Daejeon (KR)

(72) Inventors: Hee Chul Eun, Daejeon (KR); Na On Chang, Daejeon (KR); Seon Byeong Kim, Daejeon (KR); Wang Kyu Choi, Daejeon (KR); Sang Yoon Park, Seoul (KR); Hui Jun Won, Daejeon (KR); Man Soo Choi, Daejeon (KR); Byung Seon Choi, Daejeon (KR); Jei Kwon Moon, Daejeon (KR); Chong Hun Jung, Daejeon (KR); Song Bok Lee, Daejeon (KR); Sang Hun Lee, Gyeongsangnam-do (KR); Bum Kyoung Seo, Daejeon (KR)

(73) Assignee: Korea Atomic Energy Research Institute, Daejeon (KR)

(*) Notice: Subject to any disclaimer, the term of this patent is extended or adjusted under 35 U.S.C. 154(b) by 486 days.

(21) Appl. No.: 16/859,465

(22) Filed: Apr. 27, 2020

(65) Prior Publication Data
US 2021/0335513 A1    Oct. 28, 2021

(30) Foreign Application Priority Data
Oct. 21, 2019    (KR) .................. 10-2019-0130635

(51) Int. Cl.
*G21F 9/30* (2006.01)
*C03C 4/00* (2006.01)
*C03C 3/066* (2006.01)

(52) U.S. Cl.
CPC .............. *G21F 9/305* (2013.01); *C03C 3/066* (2013.01); *C03C 4/0042* (2013.01); *C03C 2204/00* (2013.01)

(58) Field of Classification Search
CPC .... G21F 9/305; C03C 4/0042; C03C 2204/00
See application file for complete search history.

(56) References Cited

U.S. PATENT DOCUMENTS 8,262,950 B1    9/2012    Nenoff et al.

FOREIGN PATENT DOCUMENTS

| CN | 104445920 A | 3/2015 |
| CN | 109775994 A | 5/2019 |
| CN | 109949962 A | 6/2019 |
| FR | 2940718 A1 | 7/2010 |
| JP | H11295487 A | 10/1999 |

(Continued)

OTHER PUBLICATIONS

Seach Report dated May 3, 2022 in corresponding French Application No. FR 2003980.

(Continued)

*Primary Examiner* — Khanh T Nguyen
(74) *Attorney, Agent, or Firm* — Fox Rothschild LLP

(57) ABSTRACT

The present disclosure provides a solidifying method of a radionuclide. The solidifying method of the radionuclide includes operations of: providing a low melting point glass including $Bi_2O_3$, $B_2O_3$, ZnO and $SiO_2$; providing a glass mixture mixing a mixture to be treated containing a hydroxide of radionuclide and $BaSO_4$ and the low melting point glass; and heating the glass mixture.

12 Claims, 3 Drawing Sheets

(56) References Cited

FOREIGN PATENT DOCUMENTS

| | | |
|---|---|---|
| JP | 2008-102087 A | 5/2008 |
| JP | 2014-142336 A | 8/2014 |
| KR | 10-1507148 B1 | 4/2015 |
| KR | 10-1578623 B1 | 12/2015 |

OTHER PUBLICATIONS

I.W. Donald et al., "The immobilization of high level radioactive wastes using ceramic and glasses", Journal of Materials Sciences, vol. 32, pp. 5851-5887 (1997).
Jinmo Ahn, et al., "Development of metakaolin-based geopolymer for solidification of sulfate-rich HyBRID sludge waste", Journal of Nuclear Materials, 518, 2019, pp. 247-255.
Mei-Yu Chen, et al., "Dielectric Properties of Ultra-Low Sintering Temperature A1203-BBSZ Glass Composite", Ceram. Soc., 2015, 98(4) pp. 1133-1136.

SOLIDIFYING METHOD OF HYDROXIDES OF RADIONUCLIDES

CROSS-REFERENCE TO RELATED APPLICATION(S)

This application claims benefit of priority to Korean Patent Application No. 10-2019-0130635 filed on Oct. 21, 2019 in the Korean Intellectual Property Office, the disclosure of which is incorporated herein by reference in its entirety.

BACKGROUND

1. Field

The present disclosure relates to a solidifying method of a radionuclide, and more particularly, to a solidifying method of a mixture to be treated containing a hydroxide of a radionuclide and $BaSO_4$.

2. Description of Related Art

A corrosion oxide layer containing radionuclides is formed an inside the primary cooling system of a nuclear power plant, and in order to reduce exposure of a worker to radiation during maintenance of the cooling system, it is generally necessary to remove the corrosion oxide layer, and in general, a chemical decontamination process including a HP CORD UV process is widely used to reduce the corrosion oxide layer in the cooling system.

However, in the decontamination process as described above, a problem occurs, in which a base material of the cooling system is damaged, and treatment of decontamination waste solution is difficult, such that the Korea Atomic Energy Research Institute (KAERI) has developed a hydrazine-based reductive metal ion decontamination (HyBRID) process that can provide performance, similar to the conventional decontamination process while solving the problem described above.

Even in the HyBRID decontamination process, a decontamination waste solution containing metal ions and sulfate ions including radionuclides, and hydrazine may be generated, and the decontamination waste solution may be effectively treated through a decontamination waste solution treatment process utilizing precipitation and decomposition reactions, solid-liquid separation, and the like. In the process, powder particles in which $BaSO_4$ and hydroxides of radionuclides are mixed and generated as a final waste, and it is essential to solidify the mixed powder particles into stable form for final disposal thereof.

In general, 95% or more of the final waste is composed of $BaSO_4$, and when solidifying is performed by using cement, a substance known as ettringite is produced, which may cause expansion and cracking of the waste form, thus such that solidification using cement is unsuitable.

On the other hand, when a geopolymer based on metakaolin is used, it was confirmed that a waste form having high compressive strength and chemical stability may be prepared even at a high content of 40% waste loading rate (J. Ahn et al., Development of metakaolin-based geopolymer for solidification of sulfate-rich HyBRID sludge waste, J. Nuclear Materials, 518, pp. 247-255, 2019). However, since the waste form is produced by using the geopolymer has a relatively low bulk density (about 1.5 to 2.0 kg/L), a weight loss of 20% or more occurs at temperatures within 200° C., resulting in structural changes, resulting in low thermal stability, and a large amount of time (minimum 7 days) is required for preparing the waste form, including media preparation time. Therefore, development of a solidification technology that can solve the disadvantages of the final waste containing a high heat-resistant nuclide Co-60, and the like, is required.

SUMMARY

An aspect of the present disclosure is to provide a solidifying method of a powder containing a hydroxide of a radionuclide and $BaSO_4$.

According to an aspect of the present disclosure, a solidifying method of a radionuclide is provided. The solidifying method of the radionuclide includes operations of: providing a low melting point glass including $Bi_2O_3$, $B_2O_3$, ZnO and $SiO_2$; providing a glass mixture by mixing a mixture to be treated containing a hydroxide of a radionuclide and $BaSO_4$, and the low melting point glass; and heating the glass mixture.

BRIEF DESCRIPTION OF DRAWINGS

The above and other aspects, features and other advantages of the present invention will be more clearly understood from the following detailed description taken in conjunction with the accompanying drawings, in which.

DETAILED DESCRIPTION

Figure 1A:
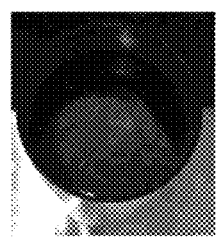
FIG. 1 illustrates the things which is water-cooled in a process of preparing a low melting point glass powder used in an embodiment (FIG. 1A) and an image (FIG. 1B) by observing the low melting point glass powder with the naked eye.

Hereinafter, preferable embodiments of the present disclosure will be described in detail with reference to the accompanying drawings. However, the embodiments of the present disclosure may be modified in many different forms and the scope of the disclosure should not be limited to the embodiments set forth herein.

A primary system of a nuclear power plant refers to a reactor system or a primary system, and various devices and equipment surrounding the reactor, for example, a control rod controlling an output of the reactor, pipes through which a coolant is circulated, pressurizers, steam generators, contaminant containers, and the like are included. In this case, metal oxides including metals or alloys contaminated by radioactivity at various positions of the primary system are formed, and the metal oxides may be chrome oxide, iron oxides, or nickel oxides.

When a metal oxide contaminated by radioactivity is decontaminated by a HyBRID decontamination process, a decontamination waste solution including a metal ion and a sulfate ion including a radionuclide, and hydrazine is generated. The decontamination waste solution may be effectively treated through a decontamination waste solution treatment process utilizing precipitation and decomposition reactions, solid-liquid separation, and the like. But in this process, powder particles containing hydroxides of radionuclides and $BaSO_4$ are generated as final wastes. Therefore it is necessary to solidify this mixed powder to a stable form for a final disposal.

Accordingly, in the present disclosure, a method for effectively treating the final waste, i.e. the powder containing the hydroxide of the radionuclide and $BaSO_4$, is provided.

In detail, a method for solidifying a radionuclide is provided. The method for solidifying the radionuclide may include operations of: providing a low melting point glass including $Bi_2O_3$, $B_2O_3$, ZnO and $SiO_2$; providing a glass mixture by mixing a mixture to be treated containing a hydroxide of a radionuclide and $BaSO_4$ and the low melting point glass; and heating the glass mixture.

The radionuclide may be a radionuclide generated from a nuclear power plant, and may include, for example, at least one selected from a group consisting of radioisotopes of chromium, cobalt, iron, and nickel metal, but is not limited thereto.

A melting point of the low melting point glass may be 440 to 460° C., preferably 450° C. If the melting point of the glass is out of the range, when the glass and the mixture to be treated containing the hydroxide of the radionuclide and $BaSO_4$ are mixed and solidified, a control of a solidification temperature for production of a homogeneous waste form and a mixing ratio of low melting point glass and the mixture to be treated may vary.

As described above, the mixture to be treated may be a waste of HyBRID decontamination process. Specifically, when the waste is obtained by decontaminating metal oxides, which is contaminated by radioactivity in the HyBRID decontamination process, a decontamination waste solution including metal ions and sulfate ions including radionuclides, and hydrazine is generated. The decontamination waste solution is a result of the decontamination waste solution treatment process utilizing precipitation and decomposition reactions, solid-liquid separation, and the like, and in this process, powder particles containing hydroxides of radionuclides and $BaSO_4$ are final waste products. In this case, the waste can consist of 95% by weight of $BaSO_4$, and in a remainder thereof, and for example a metal hydroxide containing a radionuclide can be contained, and the weight of $BaSO_4$ may vary in a range of 90 to 97% depending on the decontamination process conditions.

The powder containing the hydroxide of the radionuclide and $BaSO_4$ may be 15 to 20% by weight, preferably be 15 to 18% by weight, based on the total weight of the mixture.

When powder containing the hydroxide of the radionuclide and $BaSO_4$ is less than 15% by weight based on the total weight of the mixture, preparation of the waste form may be effectively performed, but since an amount of the waste to be treated may be small, it may be difficult to obtain a reduction effect of an amount of a final disposal waste through the solidification method proposed by the present disclosure. When power containing the hydroxide of the radionuclide and $BaSO_4$ exceeds 20% by weight, since a solidification medium is beyond a corresponding level, a waste powder that does not participate in solidification is generated, solidity (dense) of the produced waste form is poor, which may cause a problem in stability of the waste form, and thus, final disposal may be difficult to do.

Furthermore, the mixture to be treated and the low melting point glass may be provided as powders, respectively, so that the waste form obtained by the solidification method may be a homogeneous crystal form. An average particle size (particle diameter) of the low melting point glass and an average particle size (particle diameter) of the mixture to be treated are preferably performed at a similar level, for example, the average particle size of the low melting glass powder may be 0.8 to 1.2 times the average particle size of the mixture to be treated.

Meanwhile, the heating of the mixture may be performed at 500 to 550° C. When the operation of heating the mixture is performed at a temperature of less than 500° C., a problem may occur in which a bulk density of the waste form is significantly lowered, such that a problem may occur in which the waste form is easily broken. When the operation of heating the mixture is performed at a temperature of exceeding 550° C., a solidification process may not be easy due to a high temperature, and a problem may occur in which an auxiliary device is required due to gas, which is generated by converting the metal hydroxide into an oxide form.

The low melting point glass of the present disclosure includes $Bi_2O_3$, $B_2O_3$, ZnO and $SiO_2$. In detail, the low melting point glass may be prepared including operations of: mixing $Bi_2O_3$, $B_2O_3$, ZnO and $SiO_2$ powder particles; melting the mixed powder particles; cooling the molten material; and drying and pulverizing the cooled material.

In this case, an operation of mixing the $Bi_2O_3$, $B_2O_3$, ZnO and $SiO_2$ powder is to mix each powder in a certain ratio, and for example the operation may be performed by mixing 32 to 38 mol % of $Bi_2O_3$, 25 to 30 mol % of $B_2O_3$, 29 to 35 mol % of ZnO, and 5 to 7 mol % of $SiO_2$, based on the total number of moles of the powder. When the glass powder is prepared from the powder mixed in the molar ratio as described above, it is possible to prepare a glass powder having a melting point of 440 to 460° C. In this case, the homogenous mixture of each powder may be performed by using a powder stirring device of an appropriate type according to the mixing amount. When hundreds of grams of powder are mixed, mixing may be performed using agate induction or shaking in an airtight container, and in this case, mixing is preferably performed for at least 10 minutes, but is not limited thereto.

As described above, it is preferable to heat-treat the powder mixed with $Bi_2O_3$, $B_2O_3$, ZnO and $SiO_2$ powder at a temperature of 880 to 950 for 1 to 2 hours, but the present disclosure is not limited thereto. In addition, during the heat treatment, the temperature is increased to about 5 to 10° C. per minute, and during the heat treatment, an inside of the heat treatment container is not affected by an atmosphere. When considering ease of the heat treatment, it is preferable to perform heat treatment in an air atmosphere, but is not limited thereto, and the heat treatment may be performed in a high concentration oxygen atmosphere. However, when an inert gas such as argon, nitrogen, or the like, is used, costs of gas use and airtightness are considered together, which may cause disadvantages in terms of device manufacturing costs and material costs.

Figure 2:
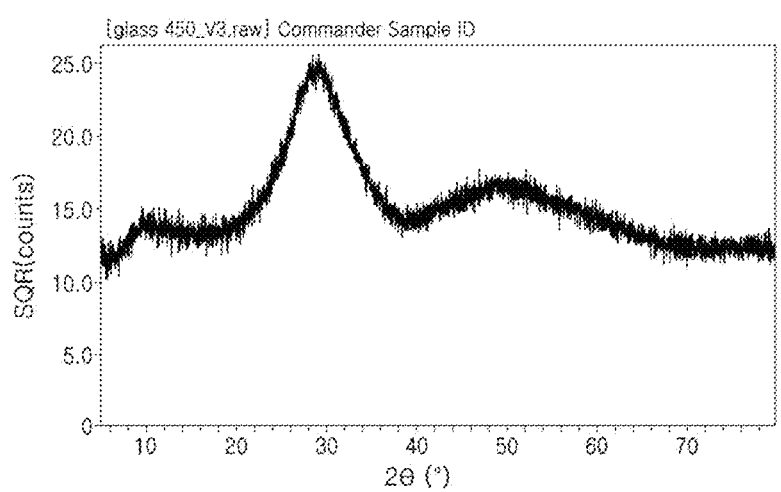
FIG. 2 illustrates an XRD analysis of the low meting point glass powder to confirm that the low melting point glass powder used in an embodiment of the present disclosure is a glass structure.

Furthermore, as described above, a molten material of the powder produced by the heat-treatment, needs to be rapidly cooled in order to have a low melting point glass structure, for which it is the most effective to cool the molten material in water. To this end, the molten material may be rapidly cooled by pouring it into distilled water, and a cooled product having a glass structure as illustrated in FIG. 2 may be obtained.

According to an amount to be pulverized in order to make the coolant of the glass structure which is obtained through the cooling process into a powder form, it is possible to pulverize the coolant using various pulverizers. For example, the pulverization may be performed such that the average particle size of the low melting glass powder is 180 to 220 mesh. If the average particle size of the low melting point glass powder is significantly small, a problem that is well scattered and difficult to be handled may occur, and if the average particle size thereof is significantly large, a solidification reaction between the low melting glass powder and the powder containing the hydroxide of the radionuclide and $BaSO_4$ does not proceed effectively, resulting in causing a problem that solidity and homogeneity of the prepared waste form becomes low, and the bulk density of the waste form is significantly reduced.

Hereinafter, the present disclosure will be described in more detail with reference to specific examples. The following examples are merely examples to help understanding of the present disclosure, but the scope of the present disclosure is not limited thereto Example (1) Manufacturing Low Melting Point Glass Powder $Bi_2O_3$, $B_2O_3$, ZnO and $SiO_2$ powder particles were mixed in 35 mol %, 27 mol %, 32 mol % and 6 mol %, respectively, based on the total powder, heated to 900° C. and melted, and then cooled through distilled water.

Furthermore, the water-cooled powder was dried and then pulverized to a particle size of a level of 200 mesh to prepare a low melting point glass powder.

Figure 1B:
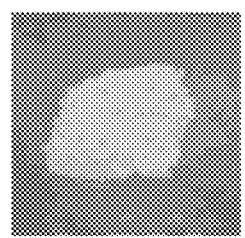

An image of the prepared low melting point glass powder was illustrated in FIG. 1B, and an XRD analysis was performed to confirm whether or not the low melting point glass powder has a glass structure, and the results thereof were illustrated in FIG. 2.

As illustrated in FIG. 2, it could be confirmed that the powder prepared by the above procedures has a glass structure.

Figure 3:
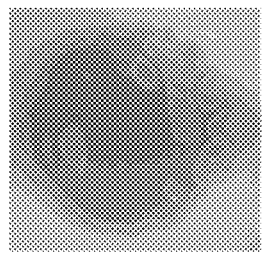
FIG. 3 illustrates results of heating the low melting point glass powder to 450° C. to measure a melting point of the low melting point glass powder used in an embodiment of the present disclosure.

Furthermore, the low melting point glass powder was heated to confirm a melting point of the low melting point glass powder. As a result, as illustrated in FIG. 3, it could be confirmed that the low melting point glass powder was melted at a temperature of 450° C.

(2) Obtaining Mixture to be Treated Containing Hydroxide of Radionuclide and $BaSO_4$ A powder of a mixture to be treated containing a hydroxide of a radionuclide and $BaSO_4$ is obtained by a HyBRID decontamination process. Specifically in the HyBRID decontamination process, a decontamination waste solution including metal ions, sulfate ions including radionuclides, and hydrazine is generated, and the decontamination waste solution was precipitation reactions using a hydroxide such as $Ba(OH)_2$ and a decomposition reaction of hydrazine using $H_2O_2$ were performed. And then generated precipitates are separated by solid-liquid separation, and the like. Therefore the powder of a mixture to be treated containing a hydroxide of a radionuclide and $BaSO_4$ is obtained from a result of the decontamination waste solution treatment process.

In this case, in the waste, $BaSO_4$ is included at a level of 95% by weight, in a remainder thereof, powder containing a hydroxide of a radioactive mock nucleus is included, the radioactive mock nucleus including a radioisotope of chromium, cobalt, iron, nickel metal. In this case, the particle size of the powder was about a level of 200 mesh.

(3) Preparing a Mixture of Powder Containing Hydroxide of Radionuclide and $BaSO_4$ and Low Melting Point Glass Powder The low melting point glass powder prepared in (1) and the powder obtained in (2) were charged to a power mixer in a weight ratio of 8.5:1.5, and mixed to be homogeneously mixed.

5 g of the mixed mixture was compressed into a cylindrical container, the container was charged into a heating furnace, and then heated at a temperature of 500° C. for 1 hour, and then cooled to room temperature.

Figure 4:
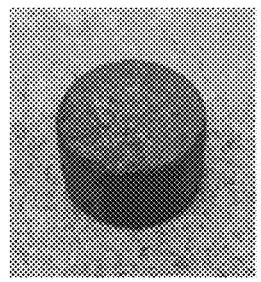
FIG. 4 illustrates an image of a waste form, which is obtained by mixing a low melting point glass powder and a powder containing a hydroxide of a radionuclide and $BaSO_4$, and solidifying in an embodiment of the present disclosure.

The waste form was obtained from the cooled container. FIG. 4 illustrates an image of a waste form. The waste form is a waste form prepared at 500° C., and has no thermal change at a temperature below 500° C., and is a relatively thermally stable waste form.

(4) Analysis of Waste Form Recovered in (3) Above [Measuring Bulk Density of Waste Form]

A bulk density of the waste form was measured using the Archimedes principle.

As a result, the bulk density of the waste form was measured at a level of 5.35 $g/cm^3$, and thus, it was confirmed that a solidification method of the present disclosure can provide a waste form of excellent density.

[Measuring Whether the Waste Form is Homogeneous]

Figure 5:
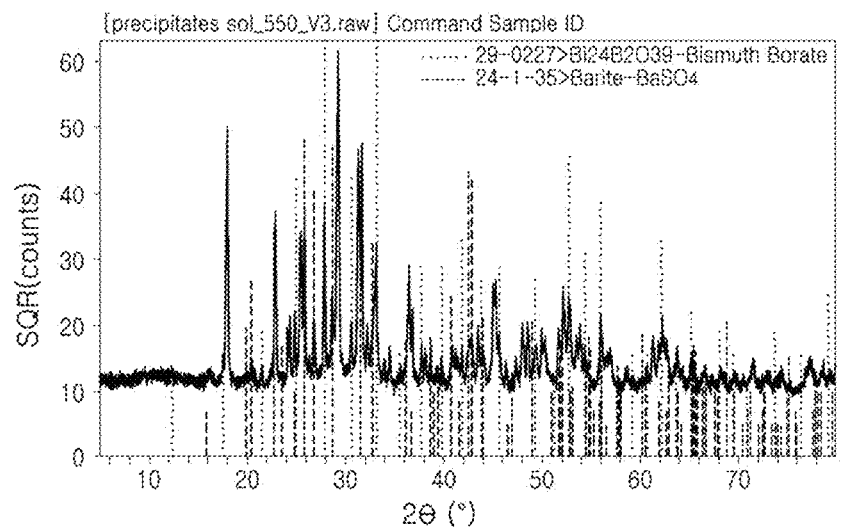
FIG. 5 illustrates XRD analysis results of the waste form to confirm structural characteristics of materials constituting the waste form, which is obtained by mixing a low melting point glass powder and a powder containing a hydroxide of a radionuclide and $BaSO_4$ and solidifying in an embodiment of the present disclosure.

In order to analyze structural characteristics of materials constituting the waste form, the waste form was powdered and an XRD analysis was performed. As a result, as illustrated in FIG. 5, it could be confirmed that $BaSO_4$ and main components of the low melting power glass powder coexist in a crystal form.

Figure 6:
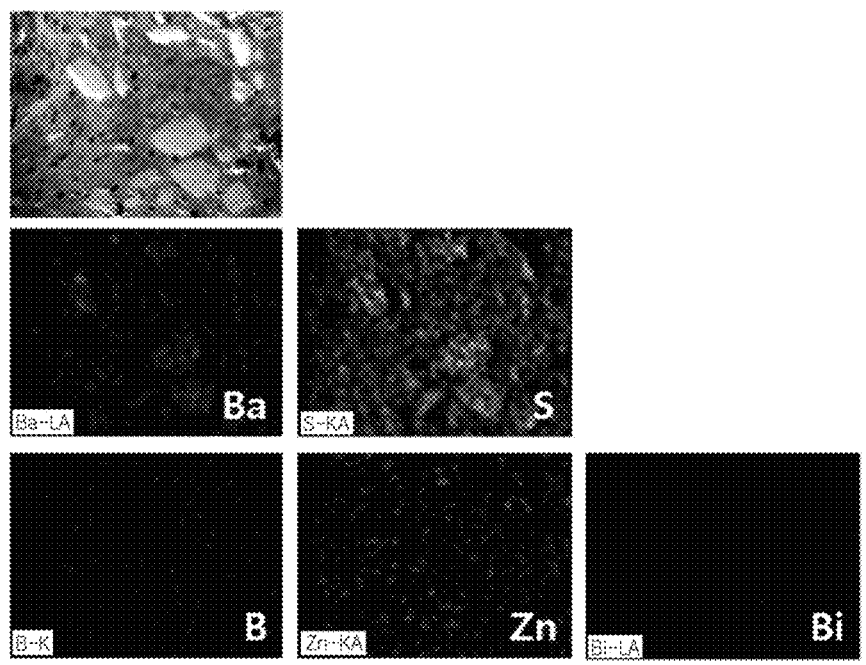
FIG. 6 illustrates analysis results of the waste form through SEM-mapping in order to check whether the waste form, which is obtained by mixing the low melting point glass powder and the powder containing the hydroxide of the radionuclide and $BaSO_4$ and solidifying, is homogenously mixed material.

Furthermore, distribution of main components in the waste form which is prepared by above method, was measured through SEM-mapping, and results thereof are illustrated in FIG. 6, and as illustrated in FIG. 6, it could be confirmed that the main components in the waste form were homogeneously distributed without phase separation, as illustrated in FIG. 6.

As set forth above, according to the present disclosure, a method that can treat a radionuclide-containing waste which is generated in a HyBRID decontamination process, into a high density and homogenous waste form, by using a low melting point glass powder at a relatively low temperature (550° C. or lower), may be provided. Compared to the solidifying method using a geopolmer currently being studied, a bulk density of the solidification result (waste form) is 2.6 to 3.5 times higher, which reduces a volume of a waste generation amount for a final disposal to a level of 35 to 50%, in consideration of a waste loading rate, thermal stability of the waste form prepared by solidifying a waste containing Co-60, which is a highly heat-resistant nuclide, is relatively high. The present disclosure is very simple, and it costs less, so that the process efficiency can be greatly improved.

Furthermore, according to the present disclosure, a homogeneous crystal waste form with a high density may be produced under low temperature conditions, and it is applicable to wastes from operations of nuclear facilities and decommissioning of nuclear power plants, in addition to wastes from a decontamination process. For this reason, the present disclosure is expected to be high utilized for solidifying wastes containing radionuclides.

While the present invention has been shown and described in connection with the embodiments, it will be apparent to those skilled in the art that modifications and variations can be made without departing from the spirit and scope of the invention as defined by the appended claims.

What is claimed is:

1. A solidifying method of a radionuclide, comprising operations of:
providing a low melting point glass including $Bi_2O_3$, $B_2O_3$, ZnO and $SiO_2$;
providing a glass mixture by mixing a mixture to be treated containing a hydroxide of radionuclide and $BaSO_4$, and the low melting point glass; and
heating the glass mixture.

2. The solidifying method of the radionuclide of claim 1, wherein the radionuclide comprises at least one selected from a group consisting of radioisotopes of chromium, cobalt, iron and nickel metals.

3. The solidifying method of the radionuclide of claim 1, wherein the low melting point glass has a melting point of 440 to 460° C.

4. The solidifying method of the radionuclide of claim 1, wherein the mixture to be treated is a waste of HyBRID decontamination process.

5. The solidifying method of the radionuclide of claim 1, wherein the mixture to be treated contains $BaSO_4$ in an amount of 90% to 97% by weight, based on a total weight of the mixture to be treated.

6. The solidifying method of the radionuclide of claim 1, wherein the mixture to be treated is included in an amount of 15% to 20% by weight in the glass mixture, based on a total weight of the glass mixture.

7. The solidifying method of the radionuclide of claim 1, wherein the mixture to be treated and the low melting point glass are provided as powders, respectively.

8. The solidifying method of the radionuclide of claim 7, wherein the powder of the low melting point glass powder is a powder having a particle size of 0.8 to 1.2 times an average particle size of the powder of the mixture to be treated.

9. The solidifying method of the radionuclide of claim 1, wherein the operation of heating the glass mixture is performed at 500 to 550° C.

10. The solidifying method of the radionuclide of claim 1, wherein the low melting point glass is obtained by including operations of: mixing $Bi_2O_3$, $B_2O_3$, ZnO and $SiO_2$ powder particles; melting the mixed powder; cooling the molten material; and drying the cooled material.

11. The solidifying method of the radionuclide of claim 10, wherein the operation of mixing $Bi_2O_3$, $B_2O_3$, ZnO and $SiO_2$ powder particles is performed by mixing 32 to 38 mol % of $Bi_2O_3$, 25 to 30 mol % of $B_2O_3$, 29 to 35 mol % of ZnO, and 5 to 7 mol % of $SiO_2$, based on the total number of moles of the powder.

12. The solidifying method of the radionuclide of claim 10, further comprising an operation of: pulverizing such that the average particle size of the low melting point glass powder is 180 to 220 mesh.

* * * * *